Figures 1, 2:
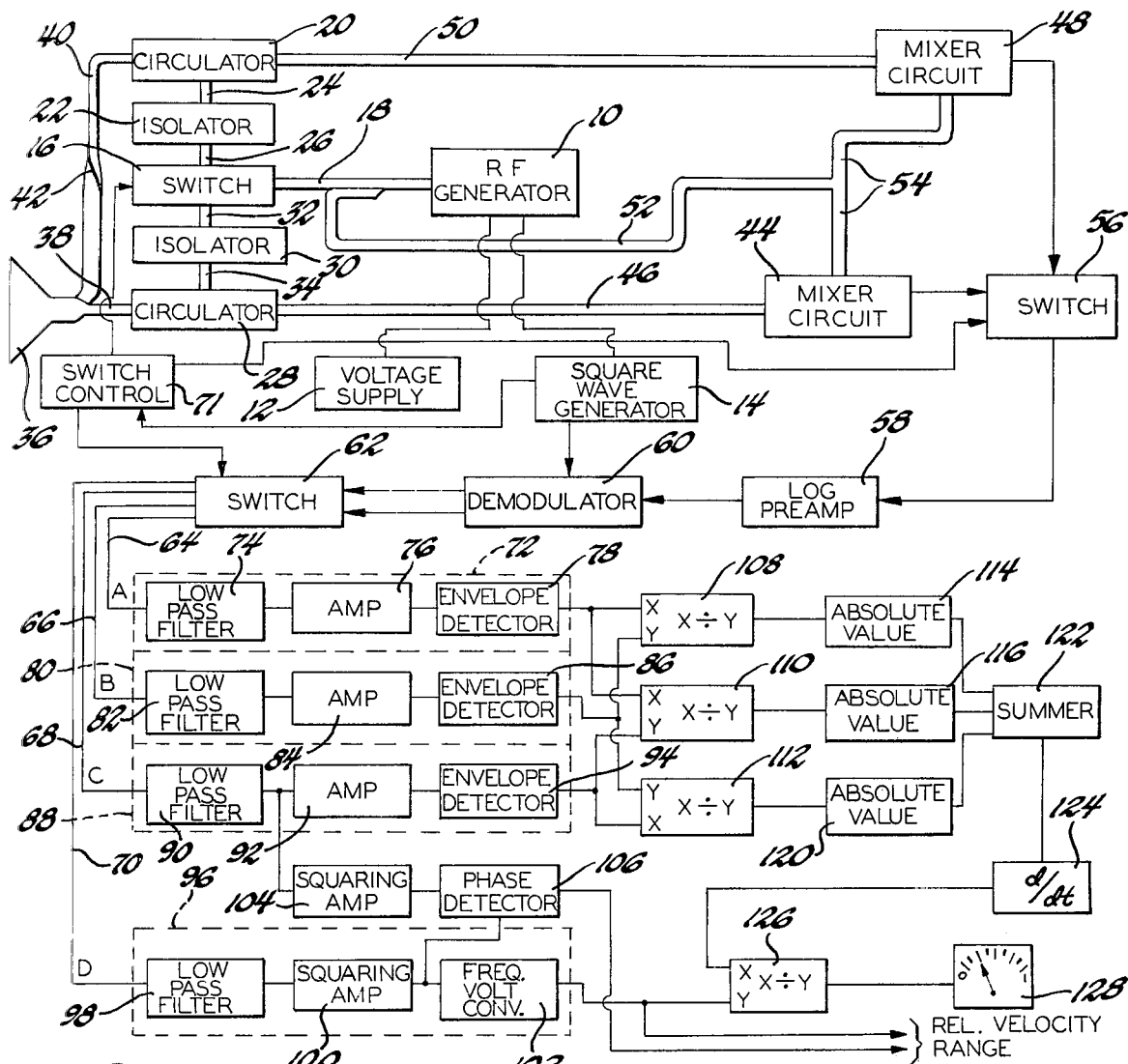

United States Patent [19]

Nagy

[11] 4,035,797
[45] July 12, 1977

[54] POLARIZED RADAR SYSTEM FOR PROVIDING TARGET IDENTIFICATION AND DISCRIMINATION

[75] Inventor: Louis L. Nagy, Warren, Mich.

[73] Assignee: General Motors Corporation, Detroit, Mich.

[21] Appl. No.: 631,851

[22] Filed: Nov. 14, 1975

[51] Int. Cl.$^2$ .................................. G01S 9/42
[52] U.S. Cl. .............................. 343/5 SA; 343/7.7; 343/8
[58] Field of Search ............. 343/5 SA, 8, 112 CA, 343/7.7, 100 PE

[56] References Cited

U.S. PATENT DOCUMENTS

| | | | |
|---|---|---|---|
| 3,716,856 | 2/1973 | Beguin | 343/7.7 |
| 3,719,945 | 3/1973 | Sletten et al. | 343/5 SA |
| 3,772,689 | 11/1973 | Root, Jr. | 343/5 SA |

Primary Examiner—Charles T. Jordan
Attorney, Agent, or Firm—H. N. Conkey

[57] ABSTRACT

A diplex doppler radar is described which includes an RF generator which generates an RF signal alternating between two selected frequencies. The RF signals are selectively vertically or horizontally polarized and transmitted by an antenna. A circuit is responsive to the received colinear and cross-polarized RF signals reflected from an object and provides an output representing the sum of the ratios of the colinear vertically polarized received signal to the colinear horizontally polarized received signal, the colinear vertically polarized received signal to the cross-polarized received signal, and the colinear horizontally polarized received signal to the cross-polarized received signal. The derivative of the sum of the ratios is divided by a signal representing the range rate of change between the obstacle and the radar system to generate a resulting signal which provides information relating to target identification and discrimination.

3 Claims, 2 Drawing Figures

| RF GENERATOR FREQUENCY | SQUARE WAVE VOLTAGE | TRANSMITTED POLARIZATION (SWITCH 16) | RECEIVED POLARIZATION (SWITCH 56) | CHANNEL SELECTOR (SWITCH 62) |
|---|---|---|---|---|
| $f_1$ | HIGH | VERTICAL | VERTICAL | A |
| $f_2$ | LOW | VERTICAL | HORIZONTAL | B |
| $f_1$ | HIGH | HORIZONTAL | HORIZONTAL | C |
| $f_2$ | LOW | HORIZONTAL | HORIZONTAL | D |

POLARIZED RADAR SYSTEM FOR PROVIDING TARGET IDENTIFICATION AND DISCRIMINATION

This invention relates to a radar system for providing information relating to target identification and descrimination.

In certain radar system applications and particularly radar systems for use in automotive vehicles, it is desirable to provide information by which identification and descrimination of objects encountered can be made.

I have discovered that object identification and discrimination can be obtained by polarizing a transmitted RF signal and monitoring the colinear and cross-polarized scattering characteristics of target. For simple radar objects the colinear and cross-polarized return ratios are substantially constant while for more complex radar objects, the colinear and cross-polarized ratios vary with variations in the range between the radar system and the object. In the case where the object is an automobile, these ratios fluctuate widely with range variations, whereas for simple objects, such as roadway signs, these ratios remain substantially constant with range variations. It is from these ratios that the complexity, discrimination and identification of objects is obtained. I have further discovered that by selectively transmitting a first polarized signal and a second polarized signal in quadrature relationship thereto, the ratios between the respective colinear returns and the colinear turns to the cross-polarized returns provides for increased sensitivity of the system to target complexity.

In view of the foregoing, it is the general object of this invention to provide an improved radar system which provides an output representative of the complexity of a radar target.

It is another object of this invention to provide a radar system for monitoring the colinear and cross-polarization characteristics of a radar target and providing a signal in response to the monitored scattering characteristics which is representative of the complexity of the target to provide for target identification and discrimination.

These and other objects of this invention may be best understood by reference to the following description of a preferred embodiment of the invention and the drawings, in which:

FIG. 1 is a diagram of the preferred embodiment of a diplex radar system illustrating the invention; and FIG. 2 is a timing chart illustrating the synchronous operation of various elements in the system of FIG. 1.

Referring to the drawing, a voltage controlled RF generator 10 is provided to generate an RF signal alternating between two selected frequencies. The RF generator may take the form of a Gunn diode and a varactor diode, each post-mounted separately in the same wave guide cavity. Generation of RF energy is achieved by using a cavity of proper dimensions and biasing the Gunn diode at the proper voltage level by a voltage source, such as a source 12 in FIG. 1. Frequency deviations of this form of generator can be induced by the varactor diode's voltage controlled capacitance. To produce an RF signal alternating between two selected frequencies, $f_1$ and $f_2$, a square wave generator 14 supplies a square wave voltage bias to the varactor diode so as to square wave modulate the frequency of the RF signal from the RF generator between the frequencies $f_1$ and $f_2$.

The RF output of the voltage tuned RF generator 10 is coupled to a wave guide switch 16 through a wave guide 18. The wave guide switch 16 is electronically controlled so as to be selectively switched to couple the output of the RF oscillator 10 to a circulator 20 through an isolator 22 and wave guides 24 and 26 or to a circulator 28 through an isolator 30 and wave guides 32 and 34. The wave guide switch 16 is operated in synchronism with the square wave generator 14 so that the RF output of the RF generator 10 is alternately coupled to the circulator 20 for one full cycle of the square wave signal from the generator 14 and to the circulator 28 for one full cycle of the square wave signal.

The RF signal supplied to the circulator 28 is coupled to a horn antenna 36 through a rectangular wave guide 38. The rectangular wave guide 38 functions to polarize the RF signal supplied thereto from the RF generator 10, which polarized signals are transmitted by the horn antenna 36. For reference purposes, the rectangular wave guide 38 will be considered to be vertically polarizing the RF signal supplied thereto from the RF oscillator 10. RF energy supplied to the circulator 20 from the RF oscillator 10 is coupled to the horn antenna 36 through a rectangular wave guide 40. The rectangular wave guide 40 is twisted at 42 so as to have an orthogonal relationship to the wave guide 38 at the point where it is coupled to the horn antenna 36. Consequently, the polarized signal supplied by the wave guide 40 to the horn antenna 36 is orthogonal to the polarized RF energy supplied to the horn antenna 36 through the wave guide 38. Consequently, for reference purposes, this polarized RF signal will be considered as being horizontally polarized as opposed to the vertically polarized signal supplied by the wave guide 38.

By the selective operation of the wave guide switch 16, as previously described, RF signals at the frequencies $f_1$ and $f_2$ are vertically polarized by coupling the RF signal from the RF generator 10 to the horn antenna 36 through the wave guide coupler 38 and horizontally polarized by coupling the RF signal to the horn antenna 36 through the wave guide coupling 40.

Vertically polarized RF signals reflected from an object and received by the antenna 36 are coupled by the wave guide 38 and the circulator 28 to a mixer circuit 44 through a wave guide 46. Horizontally polarized RF signals reflected from an object and received by the antenna 36 are coupled by the wave guide 40 and the circulator 20 to a mixer circuit 48 through a wave guide 50.

When the wave guide switch 16 is operated to couple RF signals from the signal generator 10 to the antenna 36 through the wave guide coupler 38 to effect transmission of vertically polarized RF signals, the vertically polarized signals received by the antenna 36 from an object will hereinafter be referred to as the colinear vertially polarized received signal and the horizontally polarized RF signal received by the antenna 36 from an object will hereinafter be referred to as the cross-polarized received signal. Conversely, when the wave guide switch 16 is selectively operated to couple the RF signal from the RF generator 10 to the antenna 36 to the wave guide coupler 40 to effect transmission of horizontally polarized RF signals, horizontally polarized RF signals received from an object by the antenna 36 will hereinafter be referred to as the colinear horizontally polarized received signal and the vertically polarized RF signal received by the antenna 36 is the cross-polarized received signal previously referred to.

A portion of the RF signal generated by the RF generator 10 is coupled by wave guide couplers 52 and 54 to the mixer circuits 44 and 48 where the RF signal is combined and mixed with the vertically and horizontally polarized received signal. The output of each of the mixer circuits 44 and 48 is a doppler signal having a frequency determined by the relative velocity between the radar system and an object and whose amplitude is equal to the amplitude of the vertically and horizontally polarized RF signal returns respectively. The amplitudes of the doppler signals for a given range are a function of the colinear and cross-polarization scattering characteristics of the object.

The output of the mixer circuits 44 and 48 are coupled to respective inputs of a selectively operable electronic switch 56 which is selectively operable to couple a selected one of its inputs to an output thereof. The switch 56 is operated in synchronism with the square wave generator 14 so as to couple the outputs in the mixer circuits 44 and 48 to its output in the following sequence which is continuously repeated: (1) the doppler signal obtained from the colinear vertically polarized received signal with transmission frequency $f_1$, (2) the doppler signal obtained from the cross-polarized received signal with transmission frequency $f_2$, (3) the doppler signal obtained from the colinear horizontally polarized received signal with transmission frequency $f_1$, and (4) the doppler signal obtained from the colinear horizontally polarized received signal with transmission frequency $f_2$.

The output of the electronic switch 56 is coupled to the input of a logarithmic preamplifier 58 whose output is coupled to a synchronous demodulation circuit 60. The synchronous demodulator 60 operates under control of the square wave generator 14 to sort the composite chopped signal from the switch 56 into two separate chopped doppler difference signals resulting from the transmission frequencies $f_1$ and $f_2$. The two chopped doppler signals from the synchronous demodulator 60 are coupled to a four-position electronic switch 62 which is selectively operable to couple the inputs thereto to selected output conductors 64, 66, 68 and 70.

The switch 62 is operated in synchronism with the square wave generator 14 to couple the output from the synchronous demodulator 60 to the conductors 64, 66, 68 and 70 in the following sequence which is continuously repeated: (1) the doppler signal obtained from the colinear vertically polarized received signal with transmission frequency $f_1$ to conductor 64, (2) the doppler signal obtained from the cross-polarized received signal with transmission frequency $f_2$ to conductor 66, (3) the doppler signal obtained from the colinear horizontally polarized received signal with transmission frequency $f_2$ to conductor 68, and (4) the doppler signal obtained from the colinear horizontally polarized received signal with transmission frequency $f_2$ to conductor 70.

The synchronous operation of the switches 16, 56 and 62 is obtained by a switch controller 71 which is controlled by the square wave generator 14. The switch controller 71 operates the switches 16, 56 and 62 in synchronism as previously described and as illustrated in FIG. 2.

The output of the switch 62 on conductor 64 is coupled to a colinear vertical polarization channel 72 which includes a low pass filter 74, an amplifier 76, and an envelope detector 78 whose output is a signal representing the log of the amplitude of the colinear vertically polarized received signal. The output of the four-position switch 62 on conductor 66 is coupled to a cross-polarization channel 80 which includes a low pass filter 82, an amplifier 84, and an envelope detector 86. The output of the envelope detector 86 is a signal representing the log of the amplitude of the cross-polarized RF signal received from a target. The output of the four-position switch 62 on conductor 68 is coupled to a colinear horizontal polarization channel 88 including a low pass filter 90, an amplifier 92, and an envelope detector 94. The output of the envelope detector 94 is a signal representing the log of the amplitude of the colinear horizontally polarized RF signal received from a target. The output of the switch 62 on conductor 70 is coupled to a colinear horizontal polarization channel 96 which includes a low pass filter 98, a squaring amplifier 100, and a frequency-to-voltage converter 102. The output of the frequency-to-voltage converter 102 is a signal representing the doppler frequency when the RF signal at frequency $f_2$ is being transmitted. This doppler frequency represents the relative velocity between the radar system and an object so that the output of the frequency-to-voltage converter 102 is a direct current signal representing the relative velocity or range rate of change.

The output of the low pass filter 90 in the colinear horizontal polarization channel 88 is coupled to a squaring amplifier 104 whose output is a square wave signal at the doppler signal frequency when the RF signal at the frequency $f_1$ is being transmitted. This square wave signal is coupled to a phase detector 106 which also receives the output of the squaring amplifier 100 which is a square wave signal at the doppler signal frequency when the RF signal at the frequency $f_2$ is being transmitted. The difference in phase between the two doppler signals represents the range between the radar system and the object. The output of the phase detector 106 is a signal representing the difference in phase between the two doppler signals and consequently the range between the radar system and the object.

The output of the colinear vertical polarization channel 72 is coupled to the X input of a divider 108 and to the X input of a divider 110. The output of the cross-polarization channel 80 is coupled to the Y input of the divider 108 and to the Y input of a divider 112. The output of the colinear horizontal polarization channel 88 is coupled to the Y input of the divider 110 and to the X input of the divider 112.

Each of the dividers 108, 110 and 112 functions to divide the magnitude of the signal at its X input by the magnitude of the signal at its Y input. In this manner, the divider 108 supplies a signal representing the ratio of the colinear vertically polarized received signal to the cross-polarized received signal, the divider 110 provides a signal representing the ratio of the colinear vertically polarized received signal to the colinear horizontally polarized received signal and the divider 112 provides a signal representing the ratio of the colinear horizontally polarized received signal to the cross-polarized received signal.

The output of the dividers 108, 110 and 112 are coupled to respective absolute value circuits 114, 116 and 120 whose outputs are coupled to a summer 122. The output of the summer 122 is coupled to a derivative circuit 124 which supplies a signal representing the derivative of the summed signal from the summer 122.

As previously indicated, with range changes, each of the ratios from the dividers 108, 110 and 112 are substantially constant for simple targets, such as sign posts, and vary widely with complex radar targets, such as automobiles. Consequently, the output of the derivative circuit 124 is substantially zero with range changes for simple targets and increases therefrom when objects of increasing complexity are encountered. To generate a signal representative of the complexity of the target and thereby provide for object discrimination and identification, the output of the derivative circuit 124 is divided by the signal representing the range rate of change from the frequency-to-voltage converter 102. This is accomplished by a divider 126. The magnitude of the output of the divider 126 is directly representative of the complexity of the target which can be used by means, such as a meter 128, to provide for target discrimination and identification.

The system described uses a log amplifier 58 so as to provide increased dynamic ranging capabilities of the radar system. A standard amplifier may be substituted therefore without affecting the system ability to determine target complexity.

The description of a preferred embodiment of the invention for the purpose of illustrating the principles thereof is not to be considered as limiting or restricting the invention, since many modifications may be made by the exercise of skill in the art without departing from the scope of the invention.

We claim:

1. A polarized automotive radar system for providing target identification and descrimination, comprising:
   means effective to transmit polarized RF signals toward a target;
   means effective to receive RF signals reflected from the target and being separately responsive to two orthogonally polarized received RF signals;
   means responsive to the received orthogonally polarized RF signals and effective to generate an electrical signal representing the ratio of the magnitude of the two received orthogonally polarized RF signals; and
   means effective to differentiate the electrical signal with respective time, whereby the magnitude of the differentiated electric signal during range variations between the radar system and the target provides information relating to target identification and discrimination.

2. A polarized automotive radar system for providing target identification and discrimination, comprising:
   means effective to transmit polarized RF signals at a frequency $f_1$ towards a target;
   means effective to receive colinear and cross-polarization RF signals from the target and being separately responsive thereto, the received RF signals having a frequency $f_2$ varying from the frequency $f_1$, by an amount determined by the relative velocity between the radar system and the target;
   means responsive to the received colinear and cross-polarized RF signals and effective to generate a first electrical signal representing the ratio of the magnitudes of the received colinear and cross-polarized RF signals;
   means effective to generate a second electrical signal having a magnitude equal to the differential of the first electrical signal with respect to time;
   means responsive to the transmitted polarized RF signal at the frequency $f_1$ and to one of the received colinear and cross-polarized RF signals at the frequency $f_2$ and effective to generate a third signal representing the magnitude of the relative velocity between the radar system and the target; and
   a divider effective to divide the second signal by the third signal and generate a fourth signal representing the quotient thereof, whereby the magnitude of the fourth signal provides information relating to target identificaton and discrimination.

3. A polarized automotive radar system providing target identification and discrimination, comprising:
   means effective to alternately transmit vertically and horizontally polarized RF signals at a frequency $f_1$ toward a target;
   means effective to receive the colinear and cross-polarized RF signals reflected from the target for each of the vertically and horizontally polarized transmitted RF signals, the received colinear and cross-polarized RF signals having a frequency $f_2$ different from the frequency $f_1$ by a magnitude representing the relative velocity between the radar system and the target;
   a first divider responsive to the received colinear and cross-polarized RF signals reflected from the target and effective to generate a first signal representing the ratio of the magnitude of colinear vertically polarized received signal to the magnitude of the colinear horizontally polarized signal;
   a second divider responsive to the received colinear and cross-polarized RF signals to generate a signal representing the ratio of the magnitude of the colinear vertically polarized received signal to the magnitude of the cross polarized received signal;
   a third divider responsive to the received colinear and cross-polarized RF signals for generating a signal representing the ratio of the magnitude of the colinear horizontally polarized received signal to the magnitude of the cross-polarized received signal;
   a summer effective to sum the magnitudes of the first, second and third signals and generates a fourth signal representing the magnitude thereof;
   means effective to differentiate the fourth electrical signal;
   means responsive to the frequency $f_2$ of one of the colinear and cross-polarized RF signals reflected from the target for generating a range rate of change signal representing the relative velocity between the radar system and the target; and
   means dividing the derivative of the summed first, second and third signals by the signal representing range rate of change to generate an output signal having a magnitude for providing information relating to target identification and discrimination.

* * * * *